R. E. HELLMUND.
DYNAMO ELECTRIC MACHINE.
APPLICATION FILED MAR. 23, 1914.

1,302,040.

Patented Apr. 29, 1919.

WITNESSES:
Fred H Miller
W. R. Coley

INVENTOR
Rudolf E. Hellmund
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

DYNAMO-ELECTRIC MACHINE.

1,302,040.   Specification of Letters Patent.   Patented Apr. 29, 1919.

Application filed March 23, 1914. Serial No. 826,554.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Dynamo-Electric Machines, of which the following is a specification.

My invention relates to dynamo-electric machines, and it has special reference to alternating current motors of the commutator type and to other machines of this general class.

The object of my invention is to provide a simple and inexpensive means for obviating the vibration of the core teeth in machines of the above-indicated type without sacrificing their electrical performances.

In dynamo-electric machines of the above-indicated character, it is desirable, from a mechanical stand-point, particularly in the field structures, to peripherally close the coil slots of such structures to prevent vibration of the laminated polar projections or teeth and consequent deterioration of the insulating material. On the other hand, it is desirable electrically to have the slots open to reduce the magnetic leakage.

In order to secure to the machines, in so far as may be possible, the advantages of both types of field structure, I provide a magnetizable core having a plurality of coil openings and having magnetizable material peripherally located with respect to certain of said openings in such manner as to substantially prevent local vibration of the laminations and to simultaneously allow a relatively small amount of magnetic leakage across the openings.

Figure 1:
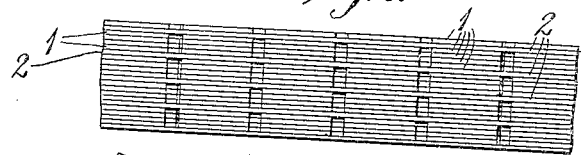
Figure 2:
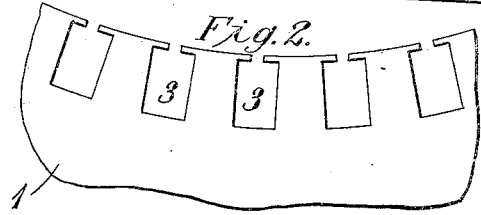
Figure 3:
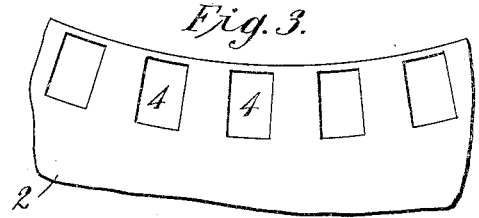
Figure 4:
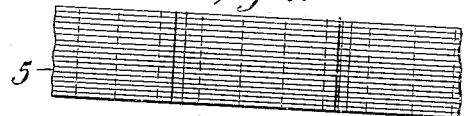
Figure 5:
Figure 7:
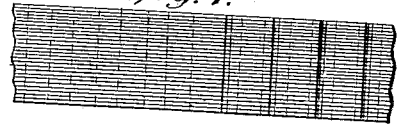
Figure 8:
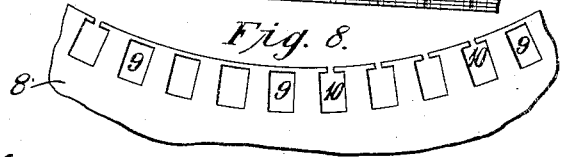

In the accompanying drawing, Figure 1 is a view, in elevation, of a portion of a magnetizable core of a dynamo-electric machine constructed in accordance with my invention; Figs. 2 and 3 are detail views of the two different types of laminations embodied in the core shown in Fig. 1; Figs. 4, 5 and 7 are views, in elevation, of modifications of my invention; and Figs. 6 and 8 are detail views of the types of laminations embodied in the structures illustrated in Figs. 4 and 5 and Fig. 7, respectively.

Referring to the drawing, the magnetizable structure shown in Fig. 1 comprises a plurality of side-by-side sets of laminations 1 of the type illustrated in Fig. 2, and a plurality of laminations 2 disposed between the sets of laminations 1 and of the type indicated in Fig. 3. Each lamination 1 is provided with a plurality of peripheral coil slots 3 of a customary type, and each lamination 2 is provided with a plurality of spaced coil openings or apertures 4; thereby providing an unbroken periphery in the laminations shown in Fig. 3, whereas the periphery of the laminations illustrated in Fig. 2 is magnetically interrupted at predetermined intervals. In assembling, the main portion of a core member is preferably formed from members 1, as in usual, producing open slots but at frequent intervals members 2 are inserted with the openings 4 in alinement with said slots, thus forming a firm mechanical union or bridge over the slot while still permitting the insertion of winding conductors. In this manner, vibration of the core teeth, with resultant injury to the insulation, is prevented and at the same time, the magnetic characteristics of the machine are substantially unaffected.

Figure 6:
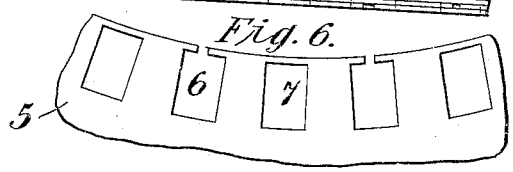

Reference may now be had to Figs. 4 and 5, wherein all the laminations 5 are of the type illustrated in Fig. 6. Each lamination is provided with alternately disposed peripheral coil slots 6 and coil apertures 7. Thus, the periphery of each lamination is magnetically interrupted at every alternate coil opening, as shown in the drawing, but it will be understood that every third or fourth coil opening may be of the peripherally slotted type, if desired.

In Fig. 4, the laminations are shown as assembled with their coil slots 6 mutually registering, thus providing alternately-disposed open and closed slots. In Fig. 5, the laminations 5 are disposed in the magnetizable structure in such manner that the coil slots 6 are laterally located with respect to each other. Thus, each of the slots 6 register with a different aperture 7, as indicated in Fig. 5. In Fig. 7, a structure composed of a plurality of laminations 8, one of which is partially illustrated in Fig. 8 as having a plurality of sets of spaced coil apertures 9 and a plurality of intermediate sets of coil slots 10, is shown. The laminations 8 are preferably assembled to have the corresponding slots mutually register, thereby forming a core structure having a plurality of sets of peripheral slots and a plurality of intermediate unbroken areas. It will be understood, without further exposition, that all the core structures illustrated are adapted to accomplish the desired object of mechanically connecting the core teeth of the magnetizable structure and thus substantially preventing vibration thereof, without causing too great a proportion of magnetic leakage between the teeth.

I do not desire to be restricted to the specific structural details herein set forth, but desire that only such limitations shall be imposed as are indicated in the appended claims.

I claim as my invention:

1. A magnetizable core for a dynamo-electric machine having coil-receiving slots and comprising laminations some of which have peripherally open slots and some of which have slots that are peripherally closed by unitary bridging members integral with the laminations on each side of the respective slots to substantially prevent local vibration of the laminations and allow a relatively small amount of magnetic leakage across the slots.

2. A dynamo-electric machine core having a plurality of coil-receiving slots and comprising laminations of magnetizable material, some of the slots in which have peripheral openings and some are peripherally closed by continuous integral portions of the laminations spanning thereover to prevent local vibration of the laminations and allow a relatively small amount of magnetic leakage across the openings.

3. In a dynamo-electric machine, the combination with a slotted core structure, of spaced bridges integral therewith and completely spanning said slots.

4. In a dynamo-electric machine, the combination with a slotted core structure, of spaced bridges of magnetizable material integral therewith and completely spanning said slots.

5. In a dynamo-electric machine, the combination with a slotted core structure, of bridges spanning said slots at intervals and integral with said core member at each abutment.

6. A core member for a dynamo-electric machine provided with a winding slot which is in part open and in part closed by bridges of material integral with said core member at each abutment.

7. A core member for a dynamo-electric machine including laminations provided with both winding notches and winding perforations adjacent an edge thereof, a winding notch in one of said laminations being disposed in line with a winding perforation in another, whereby winding slots are formed in said core member which are partially open and partially closed.

8. A core member for a dynamo-electric machine composed of laminations provided with both winding notches and winding perforations adjacent an edge thereof, a winding notch in one of said laminations being disposed in line with a winding perforation in another, whereby winding slots are formed in said core member which are partially open and partially closed.

9. A magnetizable core for dynamo-electric machines comprising a plurality of laminations severally having a plurality of spaced peripheral coil slots and a plurality of sets of intermediate coil apertures, the slots in contiguous laminations being relatively laterally displaced.

10. A core member for dynamo-electric machines composed essentially of notched laminations arranged to form open winding slots, certain of said notches being replaced by perforations, whereby said slots are in places bridged by integral magnetizable material.

In testimony whereof, I have hereunto subscribed my name this 19th day of Mar. 1914.

RUDOLF E. HELLMUND.

Witnesses:
J. V. DOBSON,
B. B. HINES.